April 1, 1941.  H. NEUMANN-LEZIUS  2,237,153
TABULATING MACHINE
Filed July 19, 1938   8 Sheets-Sheet 2

INVENTOR
Hans Neumann-Lezius
BY
ATTORNEY

April 1, 1941.  H. NEUMANN-LEZIUS  2,237,153
TABULATING MACHINE
Filed July 19, 1938  8 Sheets-Sheet 3

INVENTOR
BY Hans Neumann Lezius
ATTORNEY

April 1, 1941.    H. NEUMANN-LEZIUS    2,237,153
TABULATING MACHINE
Filed July 19, 1938    8 Sheets-Sheet 4

INVENTOR
Hans Neumann-Lezius
BY
ATTORNEY

April 1, 1941.  H. NEUMANN-LEZIUS  2,237,153
TABULATING MACHINE
Filed July 19, 1938   8 Sheets-Sheet 5
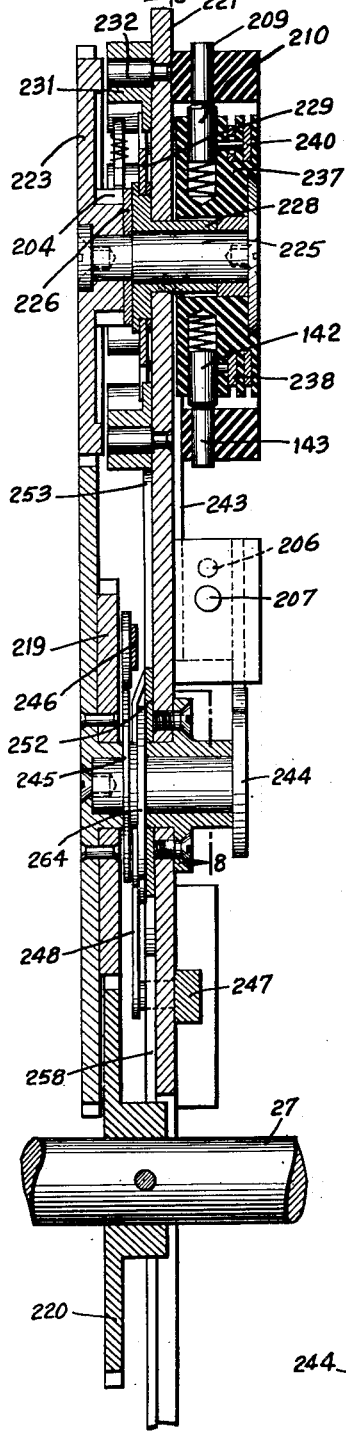
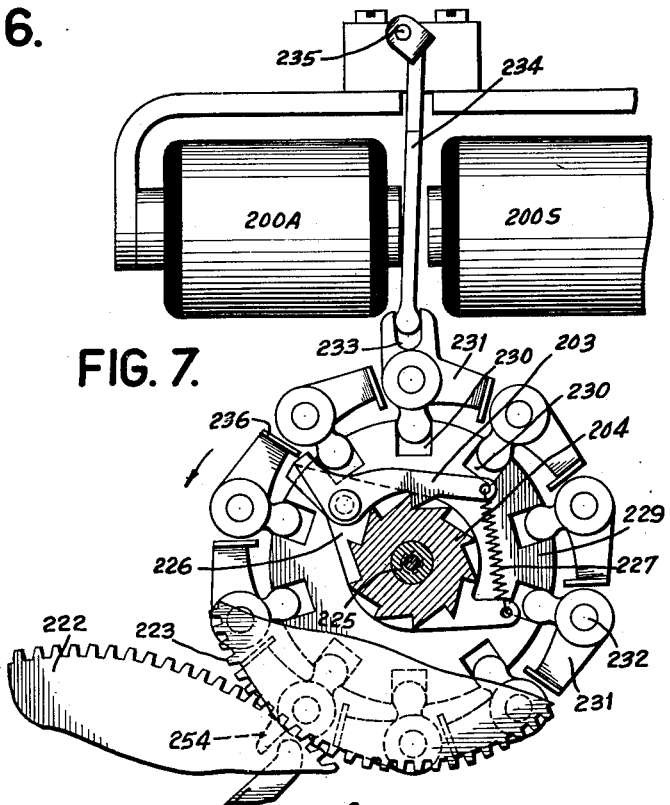
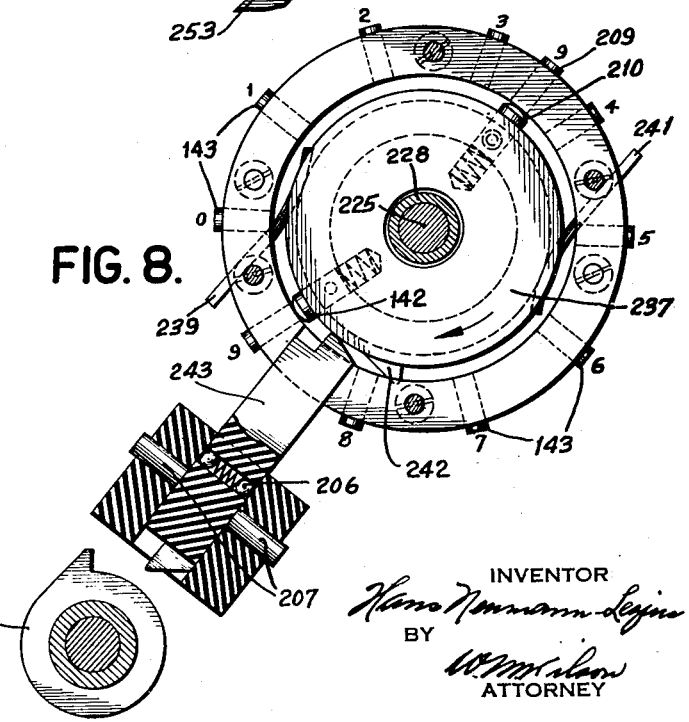
INVENTOR
Hans Neumann-Lezius
BY
W. M. Wilson
ATTORNEY April 1, 1941.    H. NEUMANN-LEZIUS    2,237,153
TABULATING MACHINE
Filed July 19, 1938    8 Sheets-Sheet 6

INVENTOR
Hans Neumann-Lezius
BY
ATTORNEY

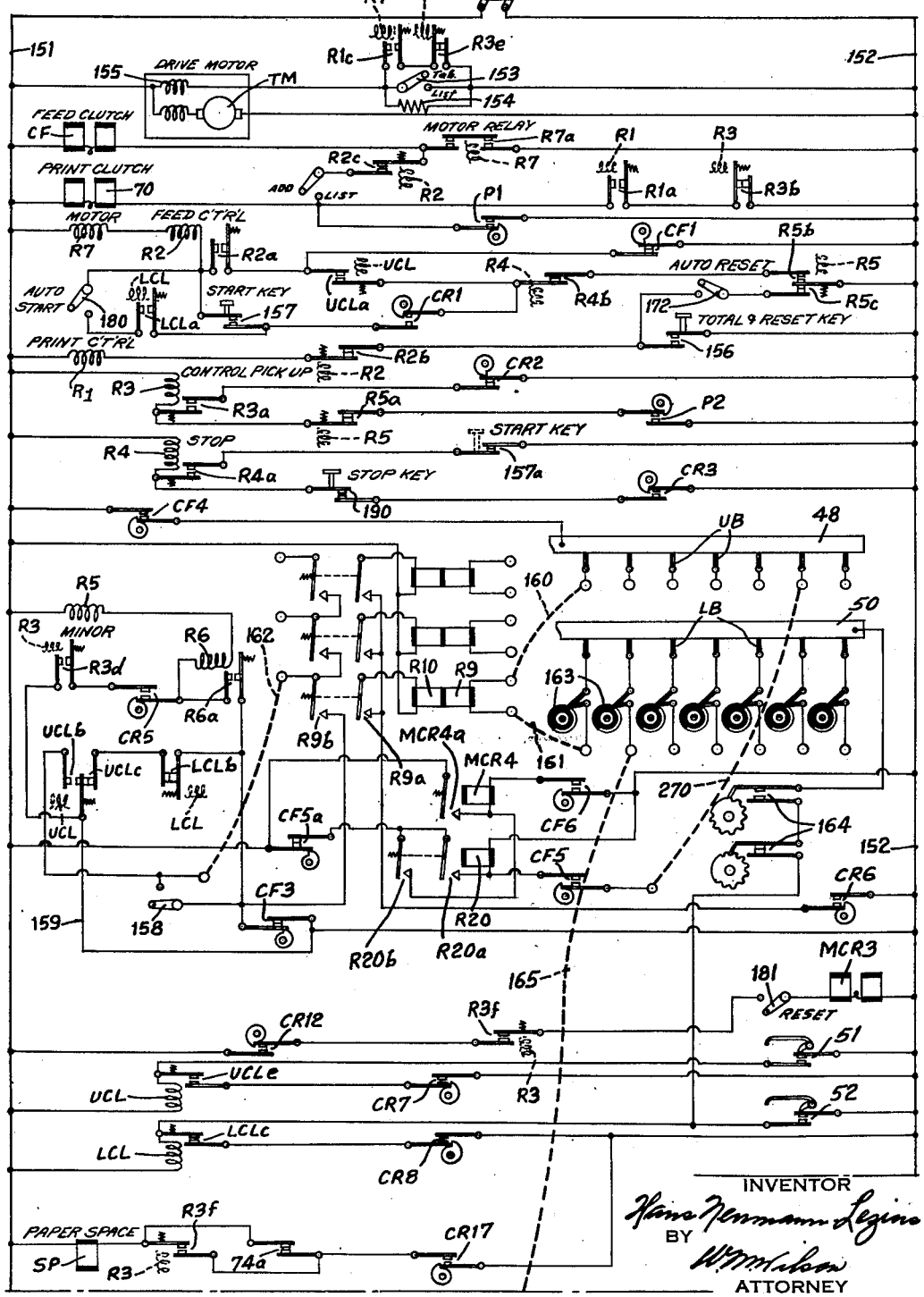

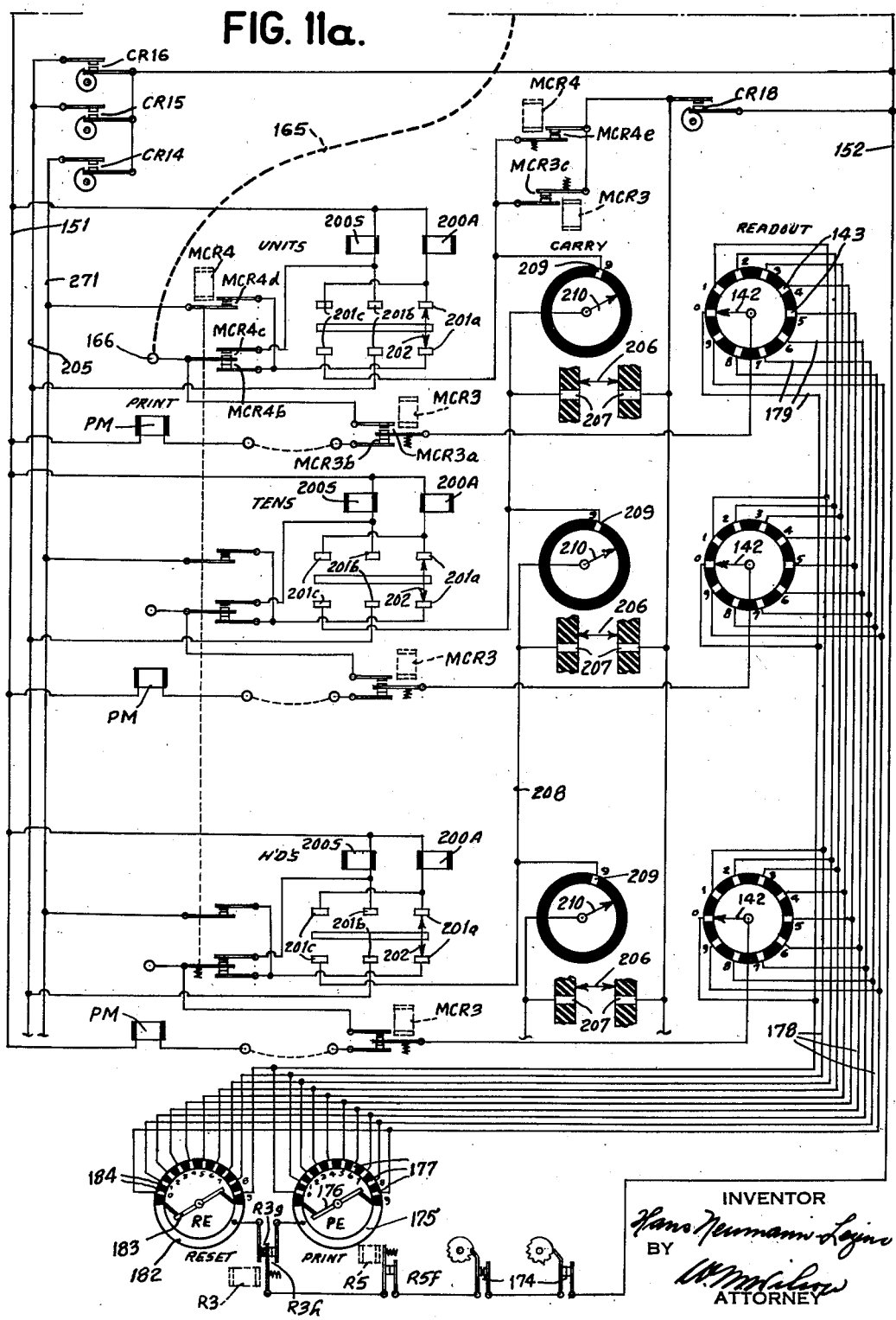

Patented Apr. 1, 1941

2,237,153

UNITED STATES PATENT OFFICE 2,237,153

TABULATING MACHINE

Hans Neumann-Lezius, Berlin-Lankwitz, Germany, assignor to International Business Machines Corporation, New York, N. Y., a corporation of New York Application July 19, 1938, Serial No. 219,983
In Germany October 7, 1937

4 Claims. (Cl. 235—61.6)

This invention relates to tabulating machines and more particularly to the accumulating mechanism of such machines.

The invention relates more particularly to the simplification of accumulating mechanism for use in high speed, record controlled accounting machines by the elimination of numerous connections and by a compactness of arrangement utilizing a type of accumulating wheel engaging mechanism not heretofore employed in accounting devices.

Electrically controlled denominational orders of an accumulator each comprise generally a driving member, a driven accumulating element, a clutching mechanism between the two and a magnet whose energization brings about a driving engagement between the driving member and the accumulating element.

In the present arrangement, the driving element is a constantly rotating ratchet and the driven element is mounted concentrically thereto and is provided with a clutch arm or dog normally held out of driving engagement by one of a series of stops arranged circumferentially in the path of the dog. A pair of opposed magnets are provided, one to move the stops radially away from the dog to permit clutching engagement and the other to return the stops again. The period of time between retraction and restoration of the stops determines the time of engagement of the clutch and the consequent extent of movement of the driven member.

A further object resides in the provision of an accumulating unit capable of adding or subtracting with the same mechanism.

A still further object resides in the provision of an improved switching arrangement for effecting declutching of the elements at the end of an entering cycle.

Another object resides in the provision of an improved readout mechanism for reading out the amount standing in the accumulator.

A further object of the invention has been to provide a novel form of electrically controlled tens carry mechanism for use in connection with the newly arranged accumulating unit.

A further object resides in the provision of a unitary accumulating unit arranged and constructed for ready, slidable removal from the machine and in which provision is made for locking the accumulating element in set position to secure the same against accidental displacement during the removal from or insertion in the machine.

Further objects of the instant invention reside in any novel feature of construction or operation or novel combination of parts present in the embodiment of the invention described and shown in the accompanying drawings.

In the drawings:

Fig. 6 is a central section through one of the accumulating units, the section being taken along line 6—6 of Fig. 5.

Fig. 7 is an enlarged position view of one of the units showing the clutching elements in driving engagement.

Fig. 8 is a detail showing the readout mechanism and the tens carry devices, the view being taken along lines 8—8 of Fig. 6.

Figs. 11 and 11a taken together and placed one above the other constitute a wiring diagram of the electric circuits of the machine.

General description

The separate units of the machine will first be described in detail and their mechanical operation explained. Following this, the circuit diagram will be explained and the complete operation of the entire machine set forth.

Figure 1:
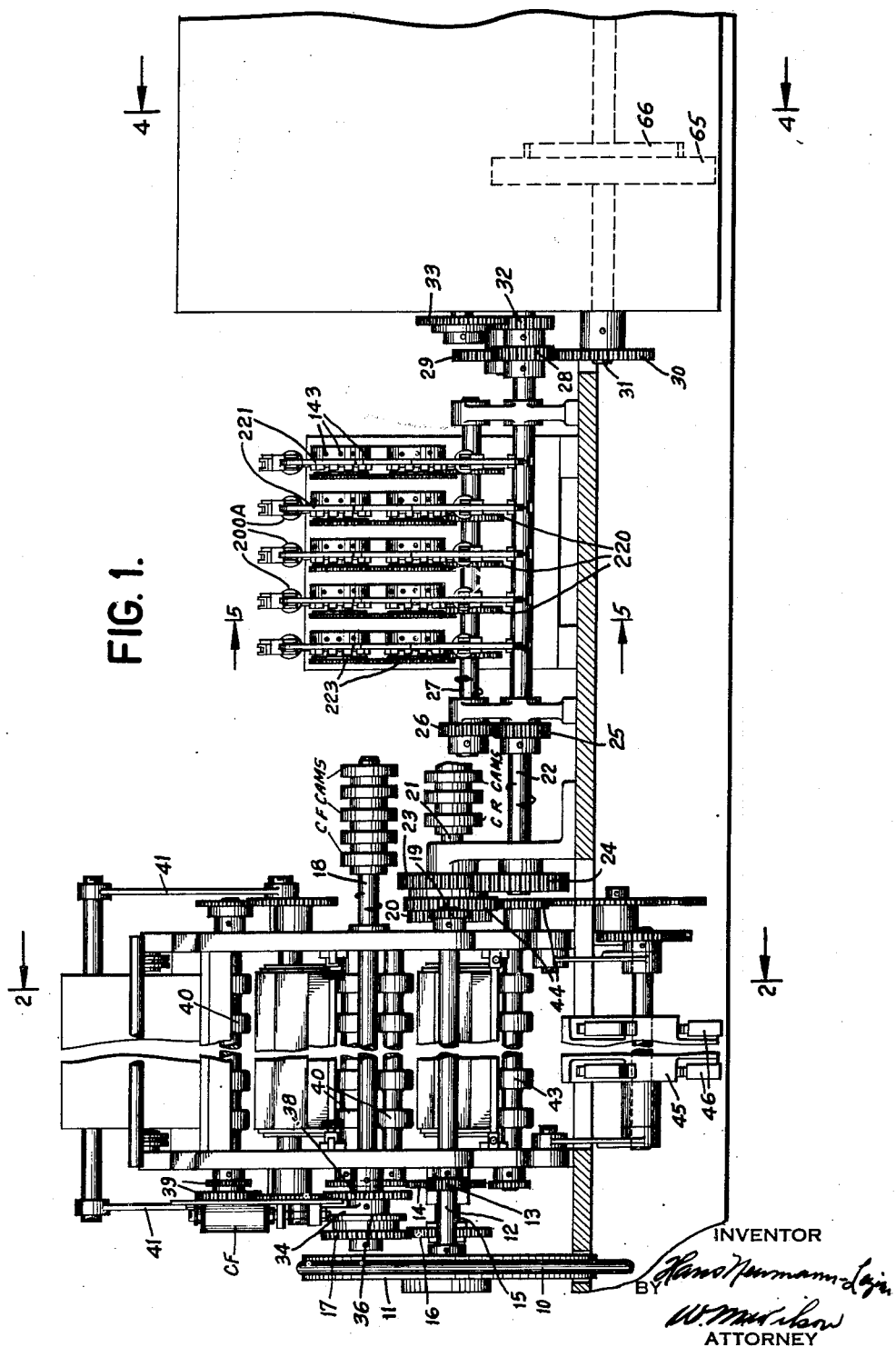
Fig. 1 is a front view of the machine showing the relationship and driving connections between the card feeding, accumulating and printing sections of the machine.

Referring to Fig. 1, the machine comprises, generally, a card feeding and analyzing section at the left end thereof, which feeds the well known Hollerith record cards to the analyzing devices where they are sensed by the analyzing mechanism. The accumulator (which has been limited to a single unit comprising five sections each carrying four denominational orders, for present purposes) is located in the center of the machine. The printing mechanism is located at the right end of the machine and comprises a number of so-called banks of printing type bars.

Main driving connections

The driving motor, represented at TM in Fig. 11 (but not shown in the mechanical views), has a suitable driving connection as by a belt 10 (Fig. 1) with a pulley 11 carried by a shaft 12. During the operation of the machine motor TM is in constant operation so that shaft 12 rotates constantly and through a gear 13 mounted thereon drives a gear 14 on a rod 15 which also carries a gear 16. The latter gear meshes with a gear 17 freely mounted on a shaft 18 to which shaft the gear is clutched to operate the card feeding devices, as will be described.

At its right hand extremity, shaft 12 carries a gear 19 meshing with a gear 20 on a shaft 21 from which the drive shaft 22 is driven by means of gears 23 and 24 so that shaft 22 is also in constant rotation. Through gears 25 and 26 the shaft 27 which operates the accumulator is driven.

Figure 4:
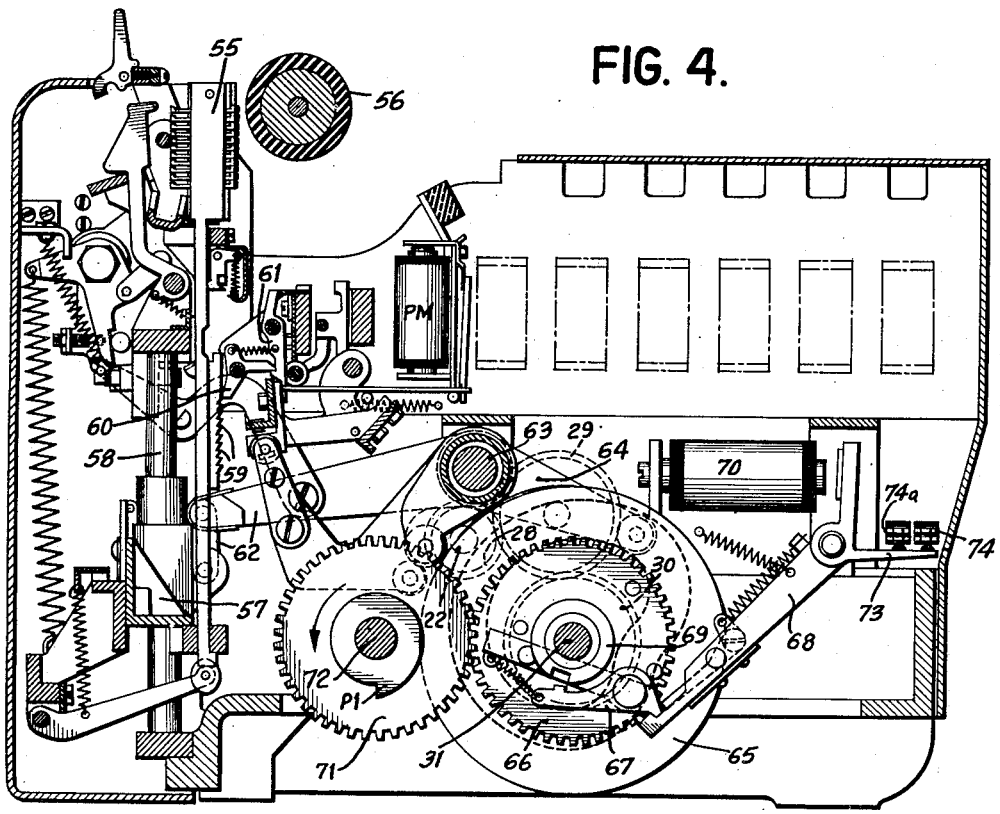
Fig. 4 is a central section through the printing mechanism of the machine, the section being taken along the lines 4—4 of Fig. 1.

To drive the printing mechanism, shaft 22 carries a gear 28 (see also Fig. 4) which through an idler 29 drives a gear 30 secured to the printing shaft 31. Shaft 22 also, through a gear 32, drives a gear 33 which operates the paper spacing mechanism (not shown) of the printing unit.

Thus through the connections traced the several shafts 12, 21, 22, and 31 are in constant rotation as long as the motor TM is in operation.

Card feeding mechanism

Figure 2:
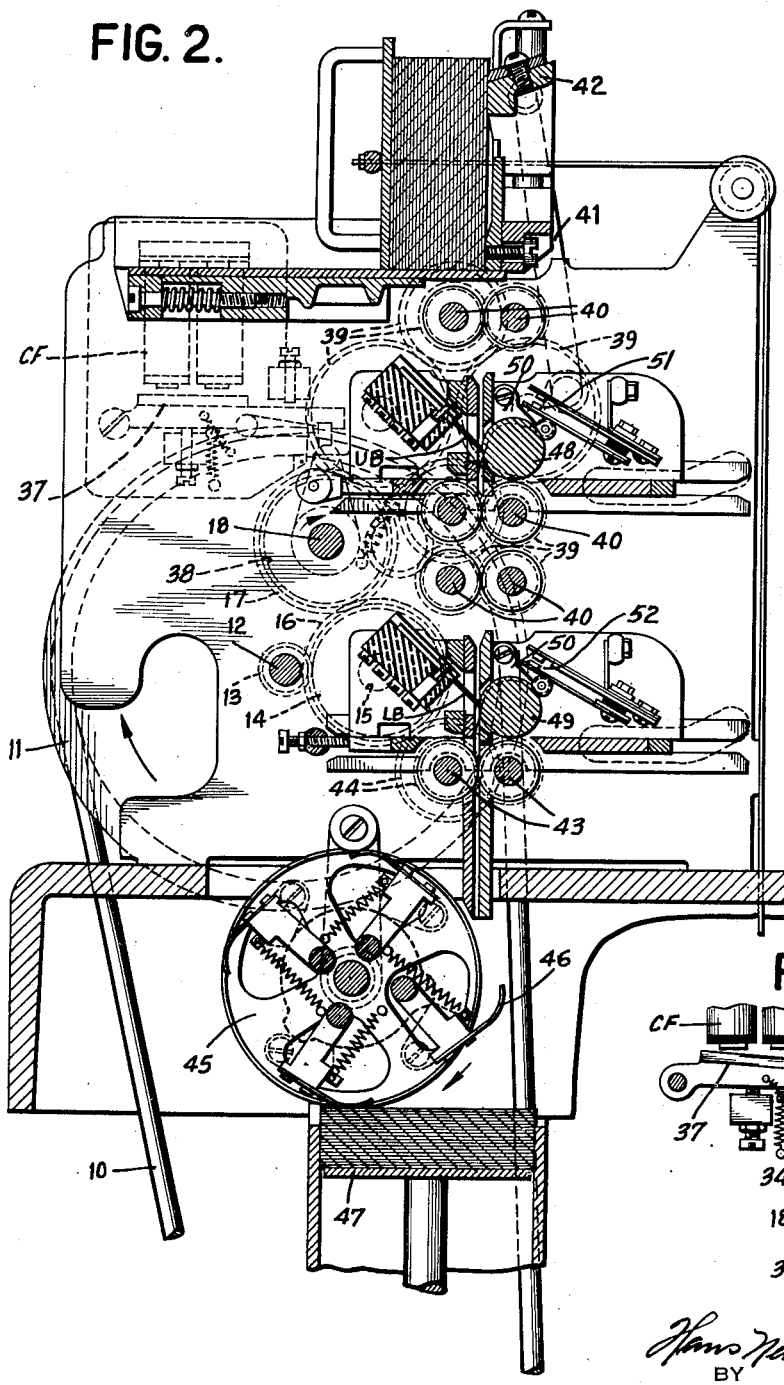
Fig. 2 is a central section through the card feeding and analyzing section of the machine, the section being taken along the lines 2—2 of Fig. 1.
Figure 3:
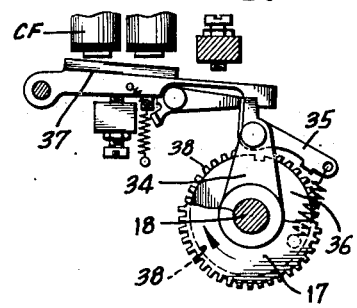
Fig. 3 is a detail of the card feed clutch devices shown in dotted outline in Fig. 2.

Referring to Fig. 3, shaft 18 has secured thereto an arm 34 which carries a spring-pressed dog 35 in the plane of a notched driving disk 36 which is integral with constantly running gear 17. Energization of magnet CF will attract its armature 37 and release dog 35 for engagement with disk 36 whereupon shaft 18 will rotate and through a gear 38 carried thereby will, through gearing generally designated 39 in Fig. 2, cause rotation of card feed roller shafts 40. One of the gears 39 on each side of the card feed section has eccentrically mounted thereon one end of a link 41 whose other extremity connects with the picker 42 mounted for vertical reciprocation so that for each rotation of shaft 18, a card is moved downwardly from the supply magazine to the uppermost pair of feed rollers. The rollers on shafts 40 advance the cards downwardly, in succession, to a pair of feed rollers on the lowermost pair of shafts 43 which are in constant rotation due to direct gear connection designated 44, with shaft 12. From this point the cards are advanced to a stacker mechanism generally designated 45 whose spring-pressed clips 46 grip the leading edges of the cards and deposit them upon tray 47.

Along the line of travel of the cards are located the upper analyzing brushes UB and the lower analyzing brushes LB mounted in insulating blocks and cooperating with contact rollers 48 and 49 respectively. At each of the sets of brushes is a pivoted card lever 50, the upper of which cooperates with a pair of contacts 51 and the lower of which cooperates with a pair of contacts 52. The levers serve to close their respective contacts while a card is passing the brushes and permit the contacts to open during the interval between cards.

The general operation of the card feeding and analyzing mechanism, in terms of cycles of operation of the machine, is as follows: (A cycle is represented by one reciprocation of the picker 42 or three and a half revolutions of shaft 12.)

With the machine at rest, the picker 42 is in the position indicated in Fig. 2 and during the first cycle, the picker will move upwardly to a position above the first card and then move downwardly to advance the leading card to the feed rollers 40 which advance it to the upper brushes UB. At the end of the first cycle, the leading edge of the card will have slightly passed the upper brushes UB, insulating them from the contact roller 48 and the picker 42 will again be in the position of Fig. 2. During the second cycle, the card will be advanced by the rollers to an exactly similar position with respect to the lower brushes LB; that is, its leading edge will be slightly past the lower brushes LB, insulating them from the contact roller 49. Meanwhile, during this second cycle, a second card will have been advanced to the upper brushes so that there is now a card under the upper brushes and a card under the lower brushes. During the third cycle, the cards will pass the lower and upper brushes concurrently and corresponding index point positions will be analyzed concurrently by the two sets of brushes. At the end of the third cycle, the first card will have been advanced to a position where its leading edge has entered the open jaws of one of the clips 46 and during a fourth cycle, the clips will grip the card and bring it into position upon the discharge stack or tray 47.

The distance between the trailing edge of the first card and the leading edge of the next card is greater than the contacting edge of the card levers (actually ¾ of an inch) so that the card levers will rock in and out between the cards.

On shaft 18 (Fig. 1) are carried several cams which control the operation of contacts designated with the prefix CF in the circuit diagram (Figs. 11, 11a) indicating that they operate only during card feeding operations. On the shaft 21 are similar cams controlling contacts designated CR in the circuit diagram to indicate that they are controlled by constantly running cams.

For a more detailed description of the construction and operation of the card feeding and analyzing mechanism reference may be had to the Patent No. 1,976,617, granted to C. D. Lake et al. on October 9, 1934.

Printing mechanism

The printing mechanism of the present machine is substantially similar to that of the Lake et al. Patent No. 1,976,617 as regards the type bar action so that the same need be but briefly described.

Type bars 55 (Fig. 4) are mounted for vertical reciprocation past a printing platen 56 and are resiliently supported at their lower ends on crosshead 57 which is slidable up and down on rods 58. Each type bar has a series of stopping teeth 59 which, as the type bar rises, pass the toe of a stopping pawl 60, normally latched as shown by a latch 61. The action is such that as the bar rises, energization of print magnet PM when any tooth 59 is passing the toe of pawl 60 will rock latch 61 to release the pawl for engagement with a selected tooth 59 and interrupt further upward movement of the bar. The yieldable connection between the bar and crosshead 57 permits the bar to stop while the crosshead continues on its invariable excursion.

For reciprocating the crosshead there is the usual link and arm connection 62 to shaft 63 which carries an arm 64 upon the free end of which is a roller engaging in the cam groove of a box cam 65, freely mounted on constantly running shaft 31. The cam 65 has secured thereto a gear 66 to which is pivoted a clutching dog 67 normally held in the position shown in Fig. 4 by clutch lever 68, thus holding cam 65 stationary. Lying in the plane of dog 67 is a driving disk 69, secured to shaft 31 so that upon energization of clutch magnet 70, lever 68 integral with the armature of the magnet will release dog 67 to engage in the notch of disk 69 and cam 65 will accordingly be rotated to operate crosshead 57 and type bars 55.

Gear 66 meshes with a gear 71 on shaft 72 to drive the latter on which are mounted contact operating cams whose contacts are prefixed P in the circuit diagram (Figs. 11 and 11a) to indicate that they operate only during printing operations. An extension 73 of lever 68 cooperates with pairs of contacts 74 or 74a to close the same while the magnet 70 remains energized.

Accumulator

Figure 5:
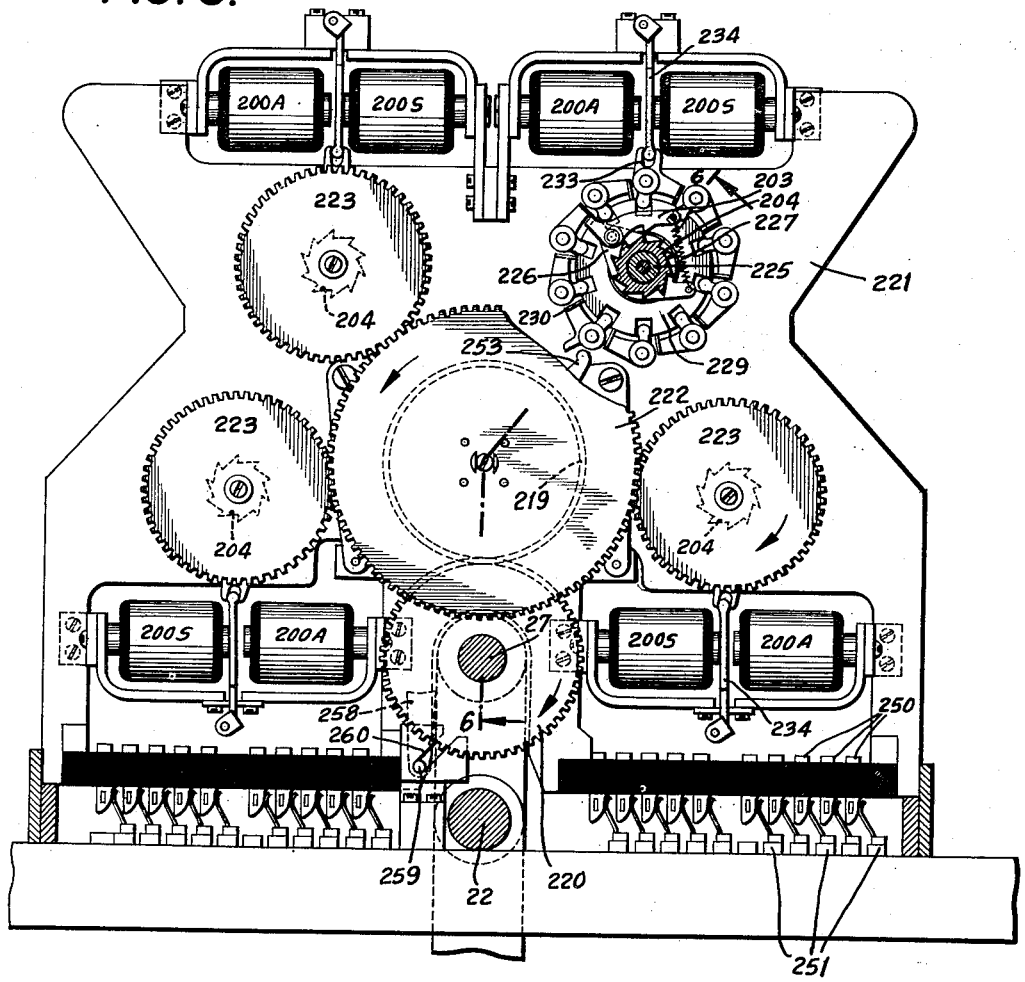
Fig. 5 is a section through the accumulator along the lines 5—5 of Fig. 1. The view is taken along the dividing line between two adjacent denominational orders.

Referring to Figs. 1 and 5, the shaft 27 has secured thereto a number of gears 220. For each of these gears there is a plate 221 upon which are mounted four orders of accumulating mechanism. Each plate is suitably notched for vertical insertion in the machine and has mounted thereon a gear 219 meshing with the gear 220 (see also Fig. 6). Integral with gear 219 is a larger gear 222 which meshes with each of four gears 223 spaced about the circumference of the large gear. Each of the gears 223 serves to drive one order of the accumulating mechanism and the following description of one such order will suffice to explain the operation of the others, since all are identical in construction and there is no mechanical interconnection between them except the common driving gear 222 and the common supporting plate 221.

Gear 223 has integral therewith a ten-tooth ratchet 204 (see Fig. 6) which by virtue of the gear connections traced, is in constant rotation and the driving ratio is such that each tooth of ratchet 204 passes a given point for each index point position of the record cards. The gear 223 and ratchet 204 are freely mounted on a stud 225 to which is secured an arm 226 (see Figs. 5 and 7). Pivoted to the arm is a clutching dog 203 normally urged to turn in a clockwise direction by a spring 227. The stud 225 is supporting in a bushing 228 (Fig. 6) whose flange serves to support a disk 229 which is provided with ten notches 230. Located around the disk 229 are ten bell crank shaped stops 231 pivoted on pins 232 fixed in the plate 221. Each stop has one of its arms engaged in a slot 230 and one of them has a third arm 233 bifurcated to receive the free end of an armature 234 which is pivoted at 235. Normally the armature 234 is in the position shown in Fig. 5 where it has rocked the uppermost stop 231 slightly clockwise. This in turn has caused disk 229 to turn slightly in the opposite direction and cause clockwise rocking of all of the other stops 231. The spring 227 is of light tension so that, with the parts in the position of Fig. 5, the frictional contact between ratchet 204 and arm 226 tends to hold the arm biased clockwise against any tendency of spring 227 to effect counterclockwise movement of arm 226. The armature 234 remains in the position of Fig. 5 through frictional contacts between its bearings and the inertia of the connected parts as well as the residual of magnet 200S.

Each stop is provided with an extension 236 lying in the plane of the arm 226 and dog 203, so that one of the stops normally engages the dog to hold it out of engagement with the driving ratchet 204. It will be apparent that the dog 203 may be stopped in any of its ten positions by engagement with any one of the stops 231. The angle of engagement between extensions 236 and the end of arm 226 is such that there is no camming effect between the parts and the arm is definitely stopped by the extension.

The armature 234 is controlled by a pair of magnets 200A and 200S which swing it into either of its positions. When magnet 200A is energized, the stops are moved to the position shown in Fig. 7 wherein dog 203 is released for engagement with the ratchet 204 and will commence to rotate. Subsequent energization of magnet 200S will swing the stops back into the position of Fig. 5 and dog 203 will be disengaged and intercepted at whatever stop it happens to be adjacent to at the time the magnet 200S is energized, and the amount which the dogs are advanced is determined by the time interval between the energization of magnet 200A and the subsequent energization of magnet 200S.

As will be explained in connection with the circuit diagram, magnet 200A is energized in response to the sensing of perforations in the record cards as they traverse the sensing brushes so that if, say for example, a "6" hole is sensed, magnet 200A is energized at the "6" time in the cycle. The magnet 200S is invariably energized at the "0" time, so that dog 203 is coupled for movement at "6" and uncoupled at "0" after it has advanced six steps to effect an entry "6."

When an accumulator order is used for subtraction or, as subtraction is carried out in machines of this type by complemental addition, magnet 200A is initially energized at the "9" time and magnet 200S is energized in response to the sensing of a perforation resulting in the advance of dog 203 an amount proportional to the 9's complement of the value of the perforation sensed in the card. For example, with a value "6" to be subtracted, magnet 200A is energized at 9 and three points later when the "6" hole is sensed, magnet 200S is energized, and disengagement takes place after three steps of movement.

*Readout device.*—The stud 225 to which arm 226 is secured carries a wheel 237 of insulating material in which is mounted a spring pressed contact plunger 142 which is advanced to successively contact with ten fixed contacts 143. As dog 203 is advanced, the plunger 142 is carried therewith and will take a position in engagement with one of the contacts 143 in accordance with the amount standing in the unit. Suitable collector ring 238 and brush 239 are provided to supply current to the plunger 142 to complete circuits through the contacts 143 as will be explained in connection with the circuit diagram.

In the plane of contacts 143 is a special contact 209 which cooperates with a plunger 210. This plunger and contact make engagement only when the unit is positioned to register a 9 and is effective for 10's carrying operations. This plunger is also provided with a suitable collector ring 240 and brush 241 (Figs. 6 and 8). The wheel 237 has a camming projection 242 which, when the wheel moves from its 9 to 0 position, will engage a slide 243 and move it in a direction away from the axis of the wheel. The slide carries a pair of contacting balls 206 which, when the slide is shifted by projection 242, will electrically connect the pair of fixed contacts 207. The contacts 206, 207 and the contacts 209, 210 set up circuit conditions for the proper carrying of units from lower to higher orders. Connected to gear 219 (Fig. 6) is a cam 244 (see Fig. 8) which near the end of each cycle will engage slide 243 and restore it to its normal position.

Figure 9:
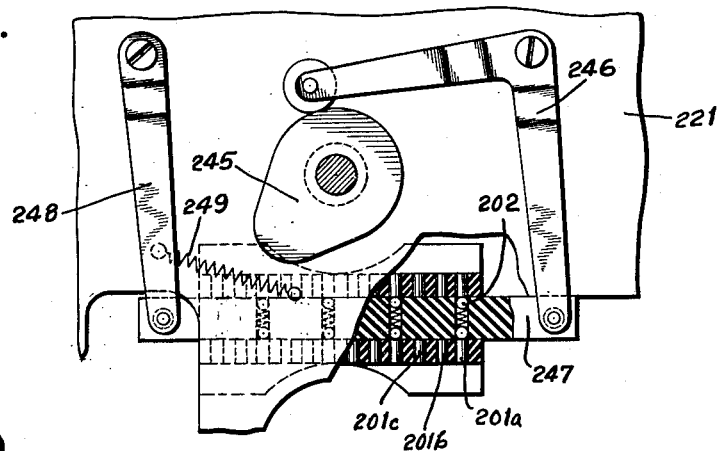
Fig. 9 is a detail of a circuit switching device.

Referring to Fig. 9, there is shown a special circuit switching device whose electrical function will be explained in connection with the circuit diagram. This switching device comprises a cam 245 which is secured to gear 219 and rotated therewith. The cam cooperates with a bell crank shaped follower 246, the other arm of which has connection with a slide 247. At the other end of the slide there is connected an arm 248 to which is attached a spring 249. For each of the four units on the plate 221 there is a pair of spring connected ball contacts 202 which, as the slide is moved toward the left, engage pairs of contacts 201a, 201b and 201c. The timing is such that during the sensing of the index point positions 9 to 1 of the record card, the balls 202 are in engagement with contacts 201a, at the 0 time they are in engagement with contacts 201b, and at the 11 time they engage the contacts 201c. Following this they return and again engage contacts 201b at the 12 time and then return to engagement with contacts 201a. The timing chart (Fig. 4a) illustrates the various periods of engagement with relation to the other contact devices in the machine.

As will be observed from Fig. 5, the plate 221 carrying four accumulating units is arranged for ready removal from the machine. The various circuit connections on the unit terminate in a series of contacts 250 which, when the unit is inserted vertically downward, will engage coacting, fixed contacts 251. With this arrangement a unit may be bodily removed from the machine without initially disconnecting any circuit connections. Provision is made to lock the various accumulating units in their set position when plate 221 is removed from the machine to guard against their being jarred out of position. This means comprises freely pivoted member 252 having arms 253 engageable with an extension 254 on one of the stops 231. Member 252 is pivoted on the bushing (see Fig. 6) which supports the pivot rod of cam 244. A lever 255 pivoted at 256 is urged by a spring 257 into engagement with member 252 and also has engagement with a three-armed member 258 whose dependent arm carries a pin 259 which, when the plate 221 is inserted in the machine, engages in a fixed diagonal slot 260 to cause clockwise rocking of the member 258 against its spring 261, whereupon spring 262 of the member 252 will rock the latter slightly clockwise so that its arms 253 are out of engagement with the stops 231, leaving them free for their normal functioning.

Figure 10:
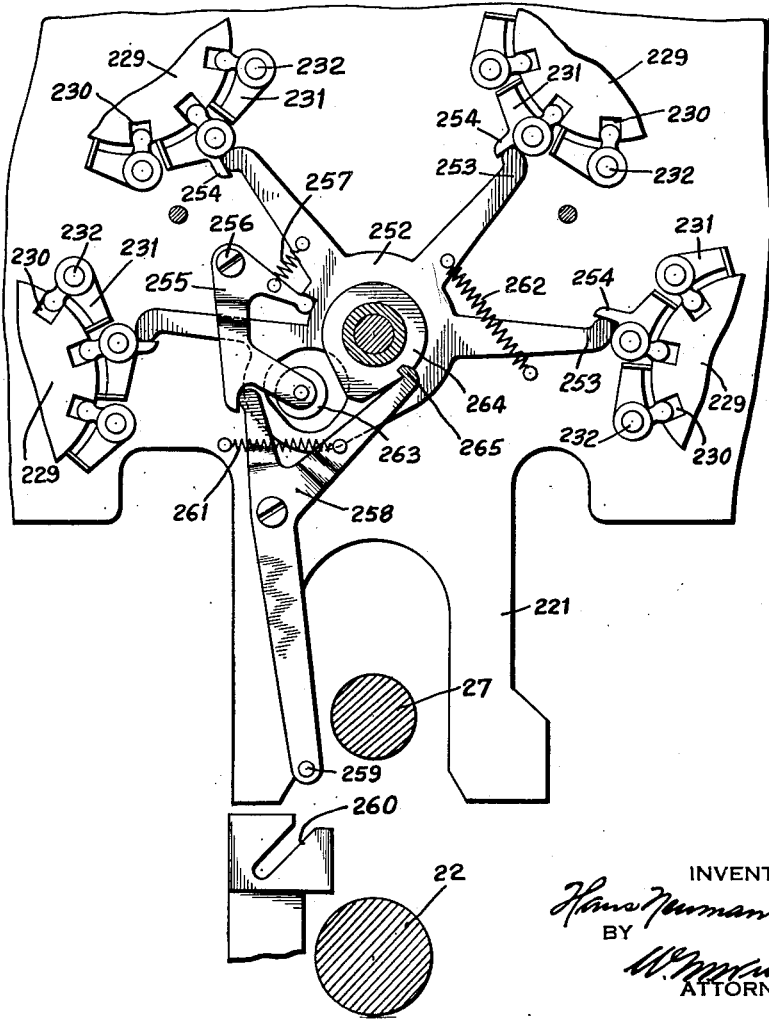
Fig. 10 is a detail of the unit locking device for locking the units in position upon removal from the machine.

The lever 255 carries a roller 263 which is engaged once each cycle by a cam 264 during the latter part of the cycle to cause clockwise rocking of the member 255 and through a strong tension spring 257 causes counterclockwise rocking of arms 253 to effect a positive restoration of the stops 231. Cam 264 is secured to the pivot rod of cam 244 (see Fig. 6) and rotates therewith. When a unit is removed from the machine, cam 264 must be positioned as shown in Fig. 10, so that a projection 265 of member 258 will engage in a suitable notch in the cam, thereby locking the rotating parts against movement and causing the spring 261 to rock the member 258 and through it member 252 into locking position.

Wiring diagram

The circuit diagram will now be explained with particular reference to the various operations of adding, subtracting, total printing, and resetting and to the sequence in which the several functions are carried out.

*Starting cycles.*—With a stack of cards placed in the supply hopper of the machine, Fig. 2, the machine is ready to start. Closure of switch 150 (Fig. 11) puts current on left side of line 151 and right side of line 152 and current will flow through the drive motor TM. If the machine is to "tabulate" that is, add without accompanying printing, switch 153 is left in the position shown so that a resistance 154 is in series with the motor field 155 to obtain high speed operation. When set for "listing" that is, concurrent adding and printing or printing alone, switch 153 is closed, shunting out resistance 154 to obtain a slower operating speed.

The first operation is to depress the total and reset key to close contacts 156 (Fig. 11) which complete a circuit from line 151, print control relay R1, relay contacts R2b and contacts 156 to line 152. Relay R1 closes its contacts R1a to energize the print clutch magnet 70 through a circuit from line 151, magnet 70, contacts R1a, R3b to line 152. The printing mechanism will now go through a cycle of operations during which the P contacts operate and near the end of this cycle contacts P2 close, establishing a circuit from line 151, control pickup relay R3, relay contacts R5a, contacts P2 to line 152. Relay R3 opens its contacts R3b to break the print clutch circuit but contacts P1 hold magnet 70 energized until the end of the cycle, and closes its contacts R3a to provide a holding circuit from line 151, relay R3, contacts R3a, constantly running contacts CR2 to line 152. As seen from Fig. 4a, contacts CR2 close when contacts P2 are closed during the aforesaid print cycle and remain closed for the major part of the next cycle during which contacts CR5 close to energize the minor control relay R5 through the following circuit: from line 151, relay R5, relay R6, contacts CR5, contacts R3d (now closed) and wire 159 to line 152. Relay R6 closes its contacts R6a to provide a holding circuit from line 151, relays R5, R6, contacts R6a, contacts CF3, to line 152.

Relay R5 when energized remains so until contacts CF3 open during a card feed cycle. It opens its contacts R5a, and R5c and closes its contacts R5b.

The start key may now be operated to close its contacts 157 so that when contacts CR1 close near the end of the cycle a circuit is completed from line 151, relays R7, R2, contacts 157, CR1, R4b, R5b (now closed) to line 152. Contacts R2a close to provide a holding circuit from line 151, relays R7, R2, contacts R2a and CF1 to line 152. Relay R7 closes its contacts R7a through which the card feed clutch magnet circuit is completed from line 151, magnet CF, contacts R7a to line 152.

The first card now commences to feed downwardly toward the set of upper brushes UB (Fig. 2) and during this cycle, cam contacts CF3 open to drop the holding circuit of relay R5. However, at the time contacts CF3 open during this first card feeding cycle, there is a shunt path around them so their opening at this time has no effect and relay R5 remains energized. Near the end of this first card feed cycle contacts CF1 open to deenergize relays R7 and R2 and card feeding ceases. If the start key contacts 157 are held closed, or again closed, the relays R7 and R2 are immediately energized again as contacts CR1 close shortly after contacts CF1 open (see Fig. 4a). Thus, a second card feed cycle will follow immediately after the first. The shunt circuit around contacts CF3 follows from contacts R6a, relay contacts LCLb, UCLc to line 152. The manner in which these contacts are controlled will be explained presently.

Just before the end of the first card feed cycle the leading edge of the first card engages the upper card lever 50 to close contacts 51 which thereupon complete a circuit through relay magnet UCL which in turn closes contacts UCLe to provide a holding circuit for the relay from line 151, relay UCL, contacts UCLe, and CR1 to line 152. The contacts CR1 alternate with contacts 51 to keep relay UCL energized as long as cards are fed to the brushes UB.

During the second card feed cycle, as the first card is advancing to the lower brushes LB, contacts UCLc are open so that when contacts CF3 open during this cycle, relay R5 will become deenergized, causing in turn deenergization of relays R2 and R7 and magnet CF, thus interrupting further card feeding and leaving the first card in a position where its leading edge is just under the lower brushes LB and the leading edge of the second card is just under the upper brushes UB.

Just before the first card reached brushes LB it closed contacts 52 to energize relay LCL which through its contacts LCLc and CR8 provide an alternate circuit to hold the relay energized during the interval between cards.

The foregoing cycles comprising a print cycle, a reset cycle and two successive card feed cycles are a necessary preliminary to advance cards into the machine when first starting. Adding operations are now ready to commence and in the following the machine will be described as set for tabulating.

*Automatic control circuits.*—The machine is provided with the usual automatic control devices which serve to keep the machine in operation as long as the control perforations on the successively fed cards are alike. This device may be disabled, however, so that operations continue as long as cards continue to feed. Disabling is effected by closing switch 158, whereby when relays R5 and R6 are initially energized and cards have reached the upper card levers a holding circuit is established from line 151, relays R5, R6, contacts R6a, switch 158, contacts UCLb to line 152 through wire 159. Therefore, with contacts UCLa also closed the motor relay R7 and feed control relay R2 remain energized through a circuit from line 151, relays R7, R2, contacts R2a, UCLa, R4b and R5b to line 152. When the last card has passed the upper brushes and contacts UCLa open as a consequence, the circuit through relays R7 and R2 is maintained for another cycle by contacts CF1 which shunt contacts UCLa, R4b and R5b and enable the last card to be advanced to pass the lower brushes LB for sensing of the data thereon.

A brief description will now be given of the operation of the automatic control device to show how card feeding is automatically interrupted between card groups. After the four preliminary cycles explained above, another print cycle and reset cycle is initiated by operation of the total key contacts 156 as before and, as before, contacts P2 energize relay R3 which in turn causes relays R5 and R6 to become energized. If plug connections 160 and 161 have been made as indicated to the corresponding column of the upper and lower brushes and a connection 162 is also made, the machine will continue card feeding as long as the index positions of the selected card column of successive cards agree.

With card feeding restarted as before, a control circuit is traceable serially through the two cards passing the brushes as follows: from line 151, contacts CF4, contact roller 48, hole in the card, brush UB, connection 160, relay winding R9, connection 161, commutator 163, lower brush LB, contact roller 50, circuit breakers 164, lower card lever contacts 52 to line 152. Relay R9 closes its contacts R9a and R9b, the former setting up a holding circuit from line 152, relay R10, contacts R9a and CR6 to line 151 which is held until contacts CR6 open at the end of the cycle. Contacts R9b provide a shunt around contacts CF3 from the contacts through R9b, connection 162, contacts UCLb and wire 159 so that relays R5 and R6 remain energized and cards continue feeding.

When successive cards fail to agree, contacts R9b will not be closed when contacts CF3 open and interruption of card feeding will take place as set forth above.

*Adding circuits.*—For each column of the card which is to be added a plug connection such as 165 (Figs. 11 and 11a) is made between a lower brush LB and a plug socket 166. Then, as the card passes the lower brushes, a circuit is completed at differential times, depending on the location of the hole to energize the accumulator magnet 200A. Assuming a "6" hole to be sensed, the circuit will be completed at the "6" time in the cycle, traceable from line 152, card lever contacts 52 (Fig. 11), circuit breakers 164, contact roller 50, "6" hole in the card, brush LB, commutator 163, plug connection 165 to socket 166 (Fig. 11a); contacts MCR4b, switch contacts 201a, 202, magnet 200A to line 151. This causes the accumulator dog 203 to be released for engagement with ratchet 204 and to be started in motion.

During the entering portion of the cycle contacts 202 are in engagement with contacts 201a and between the "1" and "0" time of the card they move to engage contacts 201b. At the "0" time cam contacts CR15 (Fig. 11a) close to complete a circuit from line 152, contacts CR15 wire 205, switch and contacts 202, 201b, magnet 200S to line 151. As a result, the clutch is disengaged after the dog 203 has moved six steps to add a "6." There is thus provided a magnetic tripping of the adding clutch at differential times depending on the value of the hole sensed and a magnetic release or knock-off at the "0" time so the amount the dog 203 rotates is proportional to the value of the hole sensed.

*Tens carry.*—If during the entering part of the cycle a unit has passed through zero it will have closed its tens carry contacts 206, 207 so that a carry circuit can now be completed from line 152, contacts CR16, contacts 206, 207 of the units order for example, wire 208, carry switch contacts 202, 201c of the tens order, which are now in engagement, magnet 200A of the tens order to line 151. The clutch is accordingly tripped and one point later switch 202 will be back in engagement with contacts 201b completing the release circuit from line 152, contacts CR16 (closed at "12") wire 205, contacts 201b, 202, magnet 200S to line 151. If the tens order stood at "9" at this time the circuit would have continued from wire 208 through contacts 209, 210 of the tens order through the next higher wire 208 to the magnet 200A of the hundreds order, and to line 151.

*Total printing operations.*—As explained above, the minor relay R5 will be deenergized when a group number change occurs and opening of contacts R5b will cause card feeding operations to stop with the first card of the new group at the lower brushes in readiness to traverse the same when card feeding resumes. If the automatic reset switch 172 (Fig. 11) is closed, a total printing cycle will follow immediately upon cessation of card feeding to print the amount or total standing on the accumulator. A circuit is completed when contacts R5c and R2b close traceable from line 151, print control relay R1, contacts R2b, switch 172, contacts R5c to line 152 resulting as before in energization of the print clutch magnet 70. As a consequence, the type bars begin to rise and contacts P1 close to shunt contacts R1a and R3b in the clutch circuit and keep the magnet 70 energized through the cycle and by breaking the circuit, take the arc.

Total printing circuits can now be completed as follows: from line 152, circuit breakers 174 (Fig. 11a), contacts R5f and R3h (now closed), common segment 175 of the "print" emitter PE, brush 176, segments 177 to impress impulses on the wires 178 in the order 9, 8, 7, etc., as the type bars present the correspondingly valued type to the platen, wire 179 to the readout segment 143 at which contact 142 is set, through the contact 142, contacts MCR3b, print magnet PM to line 151. In this manner the amount set on the accumulator readout devices is printed.

The emitter brush 176 may be mounted on the same shaft that carries the constantly running CR cams so that the brush is in constant rotation.

Near the end of the total printing cycle, contacts P2 (Fig. 11) close to cause energization of relay R3 as explained, which in turn through its contacts R3d causes energization of minor relay R5 and relay R6 during the next following cycle when contacts CR5 close. Thus total printing will take two cycles during the first of which actual total printing takes place and relay R3 is energized. In the second cycle relay R5 is energized to open its contacts R5c and interrupt the circuit to print control relay R1.

*Automatic start circuit.*—If the automatic start switch 180 is closed, card feeding will automatically resume under control of contacts CR1 which close at the end of the cycle and establish a circuit from line 152, contacts R5b, R4b, CR1, and LCLa, switch 180, relays R2 and R7 to line 151. Relay R7 again causes energization of the card feed clutch magnet CF.

*Resetting operations.*—Resetting of the accumulators is effected by entering into the accumulator the nines complement of the amount standing therein under control of the readout device and then adding a "one" into the units order during the tens carry time to advance all the wheels from nine to zero. This operation takes place during the second of the two total taking cycles and is only effective if reset switch 181 (Fig. 11) is closed. As explained, relay R3 is energized near the end of the total printing cycle and opens its contacts R3b so that the print clutch will not be energized during the second or what may be termed the reset cycle. Closure of contacts R3f under control of contacts CR12 will complete a circuit from line 151, contacts CR12, R3f, switch 181, relay MCR3 to line 152.

This relay will thereupon cause opening of its contacts MCR3b and closure of its contacts MCR3a (Fig. 11a).

Relay R3 also causes closure of its contacts R3g (Fig. 11a) one blade of which is connected to the segment 182 of "reset" emitter RE, whose segments 184 are connected by wires 185 to wires 178 in inverted order. That is, "9" segment 184 is connected to the "0" wire 178; the "8" segment 184 is connected to the "1" wire 178; etc. Thus, as emitter brush 183 rotates, circuits will be completed which are traceable from line 152, circuit breakers 174, contacts R5f, R3g, segment 182, brush 183, segments 184, wires 185, 178 and 179 to the segments 143 and to contacts 142 at times representing the nines complement of the amount indicated by the setting of contacts 142, contacts MCR3a, MCR4b, contacts 202, 201a, magnet 200A to line 151. Again at "0" contacts CR15 will be closed to declutch the dog 203 after the nines complement is entered. At the carry time contacts CR16 close to complete a circuit from line 152, contacts CR16, contacts MCR3c, contacts 202, 201c (now closed) the units order magnet 200A to line 151. This circuit also branches through the units order nines contacts 209, 210 and thence seriatim to all the other magnets 200A and nines contacts to add a unit to each thereby advancing all orders to zero.

Subtracting operations

Figure 4A:
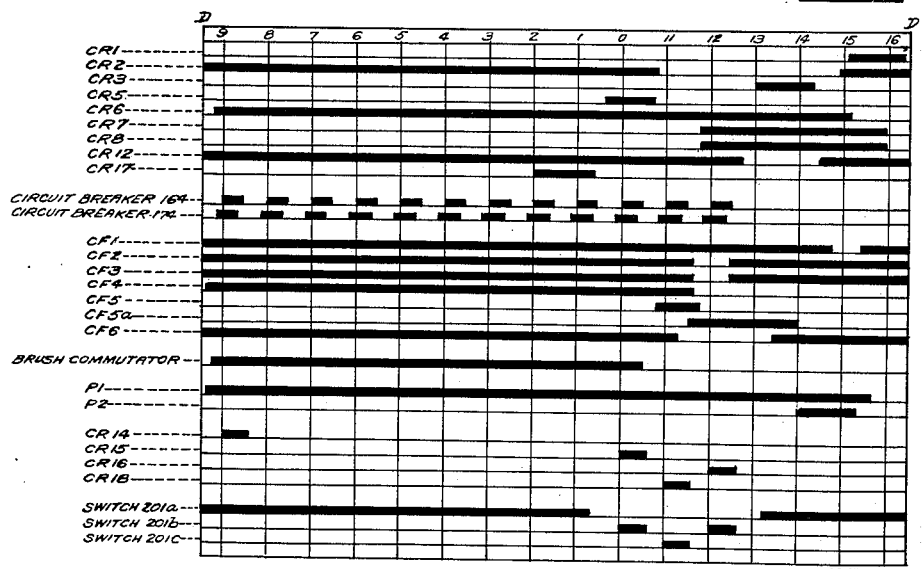
Fig. 4a is a timing diagram showing the period of closure of the various cam operated contacts and commutators.

Record cards whose amounts are to be subtracted are provided with the so-called "X" perforation made in the X or 11 index point position of a card column to designate the card as one whose amount is to be subtracted. In the column in which this perforation is made, a plug connection 270 is made (see Fig. 11), so that as this card passes the upper brushes, a circuit is completed from line 151, contacts CF4, contact roller 46, upper brush UB, plug connection 270, cam contacts CF5 closed at X, relay magnet R20 to line 152. Relay R20 closes its contacts R20a to provide a holding circuit through cam contacts CF5a which hold the circuit for a short period as indicated in Fig. 4a. Before contacts CF5a open again, contacts CF6 close, completing the circuit from line 151, contacts CF5a, contacts R20b, relay MCR4, contacts CF6 to line 152. The magnet MCR4 closes its contacts MCR4a to provide a holding circuit for the magnet which is maintained throughout the entering and carrying portion of the next card feed cycle during which the card having the X hole passes the lower brushes LB. Magnet MCR4 causes shifting of its contacts MCR4b, MCR4c and MCR4d from the position shown in Fig. 11a. With contacts MCR4d closed, a circuit is completed for each order of the accumulator at the 9 time through a circuit traceable from line 152, cam contacts CR14 which close at 9, wire 271, contacts MCR4d in the units order for example, contacts 201a, 202, magnet 200A to line 151. The accumulator element is thus engaged at the 9 time and the pawl 203 commences to rotate. When the perforation reaches the lower brush, a circuit is completed from the lower brush through the plug connection 165 to socket 166, thence through contacts MCR4c, magnet 200S to line 151, and interruption of rotation is effected after the 9's complement of the number sensed has been entered and 10's carry operations take place in the same manner as for additive entries.

In the units order provision is made to enter an additional unit whenever a subtractive entry is made so as to complement this order to 10. This is effected through contacts MCR4e which permit a carry impulse to be completed through the adding magnet of the units order traceable from line 152, contacts CR18, contacts MCR4e, contacts 201c, 202, magnet 200A to line 151.

*Stop key operation.*—Card feeding and printing may be interrupted at any time during their operation by depression of the stop key to close contacts 190 (Fig. 11) which cause energization of relay R4 when contacts CR3 close. Contacts R4a then set up a holding circuit through the normally closed start key contacts 157a and this circuit remains held until the start key is again operated. Relay R4 opens its contacts R4b, breaking the holding circuit through relays R1 and R2 so these relays become deenergized when contacts CF1 open, resulting in the opening of contacts R1a to deenergize magnets CF and 70 at the proper time to stop the operations at the end of a cycle.

*Paper spacing.*—The paper space magnet SP, Fig. 11, is energized each time the print clutch magnet 70 is energized and the circuit is traceable from line 151, magnet SP (Fig. 11) contacts 74a (closed by the armature of magnet 70) contacts CR17 to line 152. During total printing operations an additional impulse is given to magnet SP to obtain an extra space after the total. As explained above there are two cycles following a group change during the first of which the total is printed and magnet SP is energized due to closure of contacts 74a. Also during this cycle relay R3 is energized, closing its contacts R3f so that during the second or reset cycle magnet SP may be energized again when contacts CR17 close and spacing again takes place.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an accumulating unit for an accounting machine having an accumulating element which is to be advanced to any of a plurality of rotative positions to represent different amounts, including in combination differential advancing mechanism for said accumulating element, said mechanism comprising a continuously driven driving ratchet, a pawl carried by said accumulating element, a plurality of stops, spaced in the path of said pawl, there being a stop for each of said rotative positions, and any one of said stops engaging said pawl to hold the latter out of engagement with said driving ratchet, means for moving said stops concurrently into or out of the path of the pawl, means called into action at differential times and with the element in any of its rotative positions for causing said moving means to move all said stops concurrently out of the path of the pawl, whereby said one of the stops will release said pawl for engagement with said driving ratchet, and means for causing said moving means to move all of said stops back into the path of said pawl at a fixed time in the operation of the machine whereby another of said stops will engage the pawl to release it from the driving ratchet and said accumulating element will be advanced, due to the engagement and disengagement of said pawl and ratchet, from its initial rotative position an amount determined by the differential time of engagement of the pawl and ratchet.

2. In an accumulating unit for an accounting machine having an accumulating element which is to be advanced to any of a plurality of rotative positions to represent different amounts, including in combination, differential advancing mechanism for said accumulating element, said mechanism comprising a continuously driven driving ratchet, a pawl carried by said accumulating element, a plurality of stops, circumferentially arranged in the path of said pawl, there being one stop for each of said rotative positions, any one of said stops engaging said pawl to hold it out of engagement with said driving ratchet, a member common to all said stops and arranged to move the stops concurrently into and out of the path of said pawl, means called into action at differential times and with the accumulating element in any of its rotative positions for operating said member whereupon all of said stops will move out of the path of the pawl, whereby said one of the stops will release the pawl for engagement with the driving ratchet to drive the accumulating element, said means being thereafter again operated at a fixed time in the operation of the machine to restore said member whereupon all of the stops will move into the path of the pawl and one of them will disengage the pawl from the ratchet leaving the element advanced from its initial position an amount determined by the differential time of engagement of the pawl and ratchet.

3. The invention set forth in claim 2 in which the stops are pivoted, and the common member comprises a disk mounted coaxially with the accumulating element, and provided with notches to engage extensions of the stops and rock the stops into and out of the path of the pawl.

4. In an accumulating unit for an accounting machine having an accumulating element which is to be advanced to any of a plurality of rotative positions to represent different amounts, including in combination differential advancing mechanism for said accumulating element, said mechanism comprising a continuously driven driving ratchet, a pawl carried by said accumulating element, a ring of equally spaced stops, one stop for each rotative position of the accumulating element and any one of said stops normally engaging said pawl to hold the latter out of engagement with said driving ratchet, a member for moving said stops concurrently out of the path of the pawl and into a ring of larger diameter or into the path of the pawl, means called into action, with the element in any of its rotative positions for causing said member to concurrently move said stops out of the path of the pawl and into a ring of larger diameter with the stops maintaining their equi-spaced relationship, whereby said one of the stops will release said pawl for engagement with said driving ratchet, and means for causing said member to move the stops to contract to their normal ring formation whereupon one of the stops will engage the pawl to release it from the driving ratchet and said accumulating element will be advanced due to the engagement and disengagement of said pawl and ratchet from its initial rotative position an amount determined by the distance between the initially engaging stop and the second engaging stop.

HANS NEUMANN-LEZIUS.